United States Patent [19]

Szuba

[11] Patent Number: 6,094,793
[45] Date of Patent: Aug. 1, 2000

[54] INTELLIGENT FIXTURE SYSTEM

[75] Inventor: Philip S. Szuba, Clinton Township, Mich.

[73] Assignee: UNOVA IP Corp., Woodland Hills, Calif.

[21] Appl. No.: 09/261,277

[22] Filed: Mar. 3, 1999

Related U.S. Application Data

[60] Provisional application No. 60/076,798, Mar. 4, 1998.

[51] Int. Cl.$^7$ ........................................ B23Q 3/04
[52] U.S. Cl. .................. 29/33 P; 198/345.3; 408/13; 408/89; 409/131; 409/221; 414/800
[58] Field of Search ............................ 29/33 P; 409/220, 409/221, 227, 131, 132, 174; 414/408, 800; 198/345.3; 408/13, 70, 89

[56] References Cited

U.S. PATENT DOCUMENTS

| | | | |
|---|---|---|---|
| 4,475,642 | 10/1984 | Fritz | 198/345 |
| 4,541,771 | 9/1985 | Beni et al. | 414/730 |
| 4,545,106 | 10/1985 | Juengel | 29/563 |
| 4,589,184 | 5/1986 | Asano et al. | 29/430 |
| 4,662,503 | 5/1987 | Lycke | 198/345 |
| 4,685,661 | 8/1987 | Slocum et al. | |
| 4,762,218 | 8/1988 | Sticht | 198/583 |
| 4,787,814 | 11/1988 | Vaerman | 414/757 |
| 5,020,964 | 6/1991 | Hyatt et al. | 414/751 |
| 5,098,005 | 3/1992 | Jack | 228/4.1 |
| 5,178,255 | 1/1993 | Carlson | 29/33 P |
| 5,286,160 | 2/1994 | Akeel et al. | 414/744.3 |
| 5,877,432 | 3/1999 | Hartman et al. | 873/862.69 |

OTHER PUBLICATIONS

Hoffman, E.G., "Modular Fixturing," Manufacturing Technology Press, (Oct. 1, 1987).

Thompson, B.S., "Flexible Fixturing—A Current Frontier in the Evolution of Flexible Manufacturing Cells," 84–WA/Prod., ASME WAM, p. 1–7.

Cutkosky, M.R., Kurkoawa, E., and P.K. Wright, "Programmable Conformable Clamps," Autofact 4 Conference Proceedings, Society of Manufacturing Engineers, pp. 11.51–11.58.

Linton, H.C., Davies, J.B.C., and Muri, T.G.J., "Programmable Fixturing For Flexible Manufacturing Systems," Proceedings of the Institution of Mechanical Engineers, UK Search in Advanced Manufacture Paper #C360/86, p. 31–38.

Wolfgang, Hagele, T., "Workpiece Alignment With 3D Touch Probe Systems," Industrial & Production Engineering, vol. 13 (No. 1), p. 32–34, (Mar. 1, 1989).

Kellard, Andy, "Board Assembly System Uses Vision," Sensor Review, vol. 14 (No. 4), p. 32–33, (Oct. 1, 1994).

Kim, Y.C., and Aggarwal, J.K., "Positioning Three-Dimensional Objects Using Stereo Images," IEEE Journal of Robotics and Automation, vol. RA3 (No. 4), p. 361–373, (Aug. 1, 1987).

(List continued on next page.)

*Primary Examiner*—Daniel W. Howell
*Attorney, Agent, or Firm*—Brian L. Ribando

[57] ABSTRACT

An intelligent fixture system has the ability to clamp and machine a family of nonidentical parts without requiring the use of separate dedicated fixtures for each part. A first part sensing system identifies a part to be machined and configures the clamps on a fixture in accordance with the size and shape of the part. A second part sensing system determines the exact location of the part after it has been clamped into the fixture and develops error signals representative of position and orientation of the actual position of the clamped part relative to the intended position and orientation of the clamped part. X, Y, and Z position errors signals and roll error signals of the clamped part are provided as offsets to the machine tools which will machine the part in order to compensate for the errors. Pitch and yaw errors in the orientation of the clamped part are used to adjust the position of a micro-positioner located between the fixture and the pallet which carries the fixture in which the part is clamped in order to correct the pitch and yaw of the part.

8 Claims, 8 Drawing Sheets

OTHER PUBLICATIONS

Author Unknown, "LC Series, Product Literature," Keyence Corporation of America, 17–17 Route 208, North (Fair Lawn, NJ), (Oct. 1, 1996).

Goh, K.H., Phillips, N., and Bell, P., "The Applicability of a Laser Triangularization Probe to Non–Contact Inspection," International Journal of Production Research, vol. 24 (No. 6), p. 1331–1348, (Oct. 1,1986).

INTELLIGENT FIXTURE SYSTEM

This application claims the benefit of U.S. Provisional Application Ser. No. 60/076,798 filed Mar. 4, 1998.

The present invention relates to an adjustable fixture system which can be reconfigured to hold any one of a family of parts, and which is capable of sensing the exact location of the fixtured part in order to accurately machine the part.

BACKGROUND OF THE INVENTION

Part fixturing is a critical and expensive process in the machining of parts. In all high volume machining systems, dedicated fixtures are used to hold parts. However, the fixture also serves to position the workpiece in a known location so that machined features on the workpiece can be positioned with respect to a known datum. In past practices, this is accomplished by putting the part against fixture locators. The passive elements of the fixture are prescribed for a given workpiece and must be mechanically altered if the workpiece changes. The fixture typically clamps and locates the workpiece with respect to the machine tools that will conduct the metal removal process. The fixture acts as a dedicated part location system, prescribing the relationship between the workpiece datum and the machine tool coordinate system. Automotive experts consider the dedicated nature of fixturing the main barrier to the implementation of truly flexible machining systems for automotive parts, especially parts which are machined in high volumes.

Previous efforts in designing and developing flexible fixturing for either small batch manufacture or mass production scenarios can be generally divided into two groups: modular fixtures and conformable fixtures. Modular fixturing originated in the post-war era and consists of fixtures assembled from a standard library of elements such as V-blocks, toggle clamps, locating blocks, etc. Their flexibility lies in the ability to be reconfigured either manually or by a robotic device.

However, the modular fixtures have no intrinsic ability to adapt to different sizes and shapes of parts within a part family. In addition, the time necessary for reconfiguration is long, and modular fixtures generally lack stiffness. Consequently, modular fixtures appear to be more suited to a job shop environment than mass production.

The advent of Flexible Manufacturing Systems (FMS) in the early 1980's provided the impetus for work on conformable fixturing. A conformable fixture is defined as one that can be configured to accept parts of varying shape and size. Conformable fixture technology can be classified as encapsulant or mechanistic. Examples of encapsulant fixtures are found in the aerospace industry, where low melting-point metal is used to enclose turbine blades, and produce well-defined surfaces for part location and clamping for grinding operations. While an excellent means of facilitating the holding of complex parts, encapsulation is a costly and time consuming process, and is unsuitable for fixturing parts.

Mechanistic fixtures reported in the literature include the use of petal collets, programmable conformable clamps, a programmable/multi-leaf vise, and an adjustable integral fixture pallet. Of the four, the adjustable integral fixture pallet concept appears to be the most capable of accommodating a part family of castings. To date, however no feasibility studies have been conducted regarding the applicability of any of these techniques to production machining operations.

The need to reduce cycle times, partially through more aggressive cutting, has increased the forces that act on the part during machining. This drive for productivity has come at the same time that part geometry has often become more complex, with highly compliant part features and tighter tolerances. This has led to increased problems with fixture-part deformation and vibration.

A number of technologies currently exist that have the potential to be developed into a part location system. These are classified as either contact or noncontact technologies. Contact technologies include touch trigger probes and analog probes. Touch trigger probes are widely used with coordinate measurement machines for performing part metrology. There are also reported industrial applications in which a touch trigger probe is used to define datums on a workpiece for the purpose of alignment identification and tool path compensation. Unfortunately a touch trigger probe can only acquire data at a very low rate. Analog touch probes are capable of greater data acquisition rates, but to date, there have been no reported uses of analog probes for the purpose of datum establishment in machining applications.

Non-contact technologies include computer vision, laser probes, and laser scanning. Computer vision has been widely used in the electronics industry as a fast and accurate means to locate printed circuit boards for the purpose of board assembly. In these applications, the board location problem is strictly two dimensional. If multiple cameras are used, stereographic images of a part surface can be obtained. From such an image, it could be possible to establish a datum.

Laser probes are spindle-held units that operate on the principle of triangularization. Under carefully controlled environmental conditions, laser probes are capable of sub-micron accuracy. However, it is also known that the accuracy of these systems can degrade if the texture of the surface is poor or if ambient light conditions are poor. Laser scanners are similar to laser probes with the exception that they consist of either an array of laser probes or laser light emitters and receptors in the shape of lines or grid patterns. By using an array, the data acquisition time can be reduced and/or the data density can be increased.

SUMMARY AND OBJECTS OF THE INVENTION

The use of the intelligent fixture system eliminates the need for passive mechanical locators, thus giving rise to high fixture flexibility. Using the intelligent fixture system, the position of a part is not known with great precision either before or during the workpiece clamping cycle. However after a part is clamped in the fixture, a part location system is used to precisely locate the part with speed and accuracy. By determining the difference between the actual and desired position of the part, compensations to the machining program can be made for certain misalignments, and a part micro-positioner can be used to correct for other misalignments so that the part can be accurately machined.

It is accordingly an object of the invention to develop an intelligent fixture system capable of being easily reconfigured to locate and hold a family of parts with the ability to be integrated into a high production machining system.

It is another object of the invention to provide a part location system that is able to detect departures of a part in a fixture from its intended position, and to adjust part position in response to such departures.

It is another object of the invention to provide a fixturing system having sufficient fixture-part rigidity to ensure the viability of aggressive cuts while minimizing vibrations and guaranteeing stable and precise machined feature generation.

It is another object of the invention to develop an intelligent fixture system for transfer lines and flexible machining systems, including both parallel and serial processing of workpieces that utilize pallet fixtures.

It is another object of the invention to eliminate the use of passive mechanical locators on a fixture and the use of machined, nonfunctional features on a part as a means of part location.

It is another object of the invention to remove the traditional qualifying operations in the machining process such that all nonfunctional machined part features are eliminated.

It is another object of the invention to develop and demonstrate a method of sensing part location and relating the fixtured part's coordinate system, in all required orientations, to the coordinates of the machine tool.

It is another object of the invention to provide a method of adjusting part orientation to the precise level such that the part's coordinate system will coincide with the machine tool's coordinate system and all part features can be machined with little or no rotational and translational variance.

DESCRIPTION OF THE PREFERRED EMBODIMENT

Figure 1:
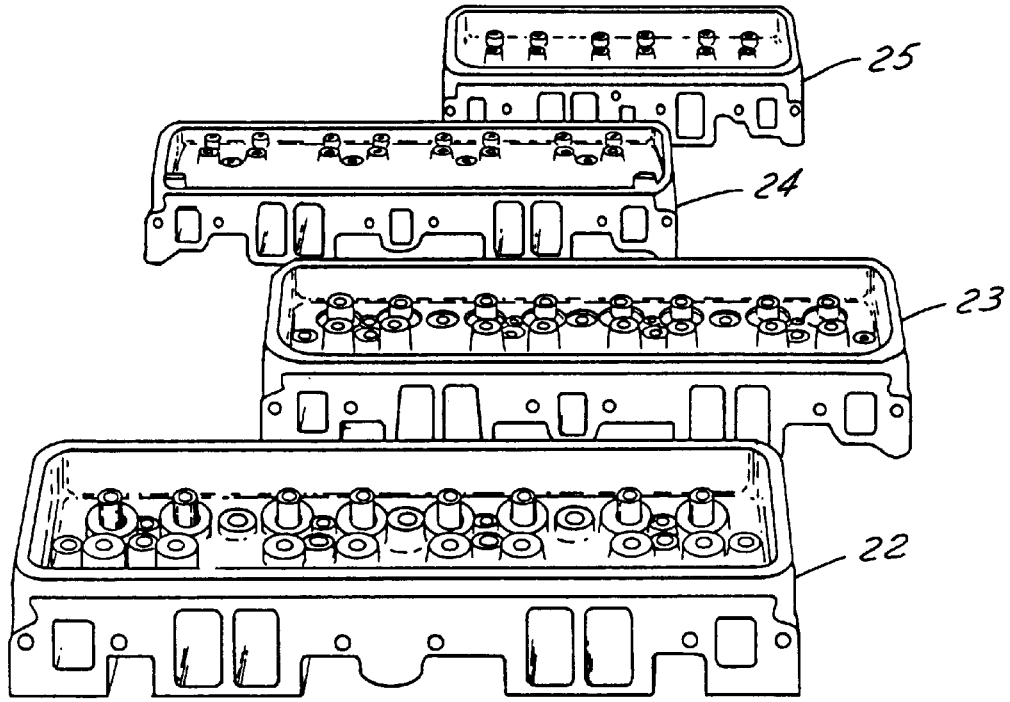
FIG. 1 shows a part family comprised of several automotive cylinder heads.

In general, fixtures used for automotive part machining are very dedicated. FIG. 1 shows a typical family of cylinder heads 22–25. While these parts are very similar in design, if they differ from one another in shape, dimension, or design, each one must be held by a different fixture during machining. Furthermore, parts can rarely be machined in a single set up. Consequently, several dedicated fixtures are usually needed to completely machine a single part.

Figure 2:
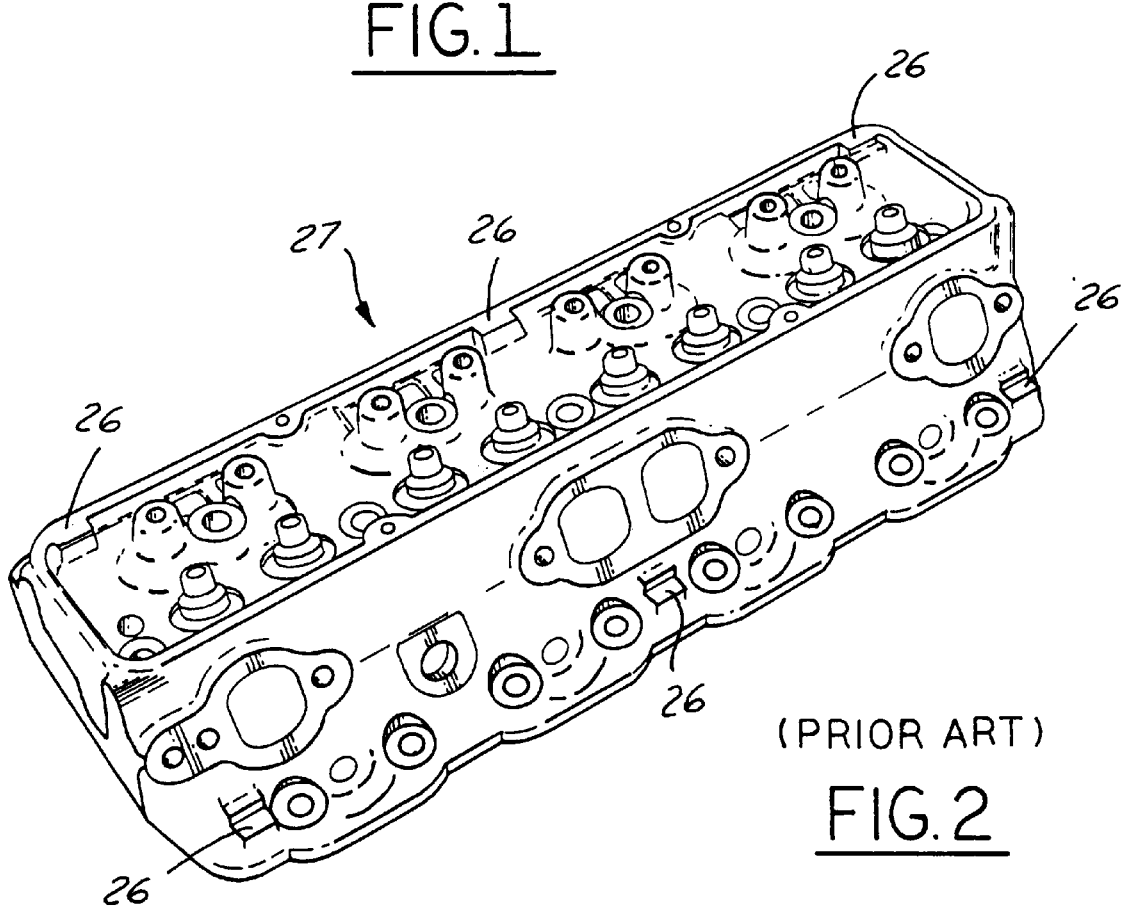
FIG. 2 shows a cylinder head with nonfunctional features indicated by arrows.

A key barrier to the implementation of reconfigurable fixtures is the convention of fixed, mechanical locators on the fixture itself. Locators are used to mate with locator points on the part in order to locate the part with respect to the pallet fixture and/or machining station. Furthermore, the use of mechanical locators requires that both the locators and the mating part features are geometrically precise. As illustrated in FIG. 2, this often necessitates the machining of nonfunctional features such as one or more locator points 26 on a part such as a cylinder head 27 to mate with downstream fixtures. This is especially true for parts that originate as castings or forgings.

In a transfer line system, the machining of nonfunctional features such as locator points 26 requires additional machining stations. In a flexible manufacturing system, the machining of non-functional features requires the addition of CNC machining cells in order to maintain production rates. Consequently, the elimination of the need to machine locator points 26 on a part 27 may eliminate the need for certain machining station and reduce part cycle times.

Figure 3:
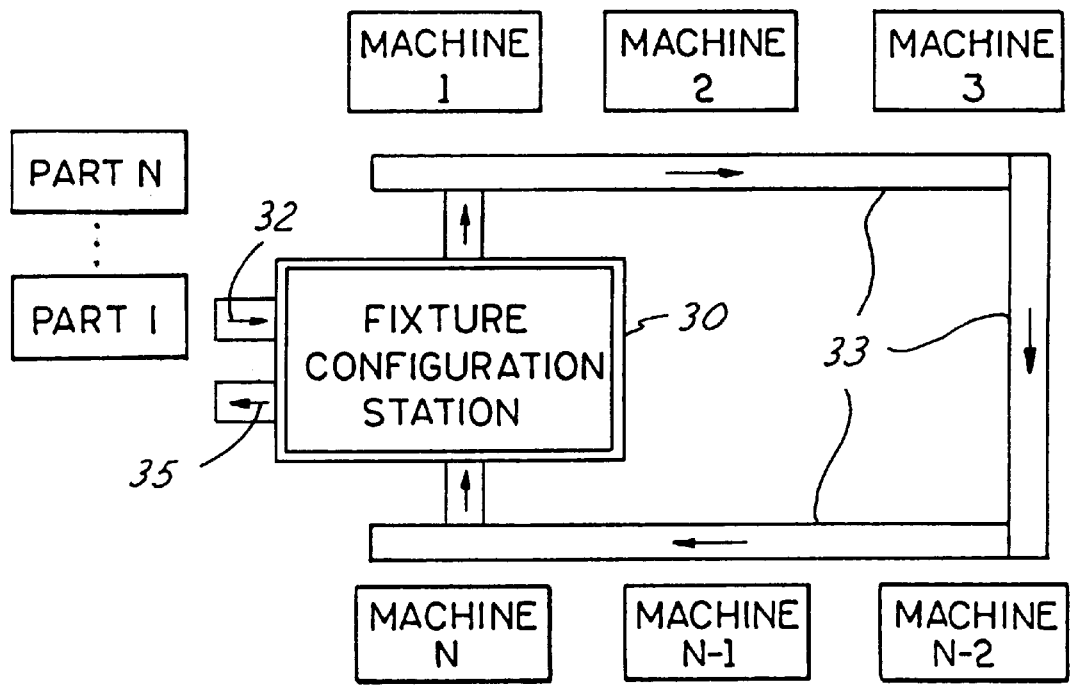
FIG. 3 is a schematic representation of a flexible fixture system in a flexible machining system.

An intelligent fixture system for a pallet fixture based machining system according to the invention is illustrated schematically in FIG. 3. The system consists of a fixture configuration station 30 which receives a plurality of non-identical parts 1 through N from an input conveyor 32. All part loading occurs at the fixture configuration station 30. Each part on its fixture is carried by the line conveyors 33 to each of the machines 1 through N for various machining operations. The line conveyors 33 return the parts to the fixture configuration station 30 to be removed from the fixture and re-clamped in a new orientation on the fixture for additional machining on different surfaces, or placed on an output conveyor 35 after all machining operations have been completed.

Figure 4:
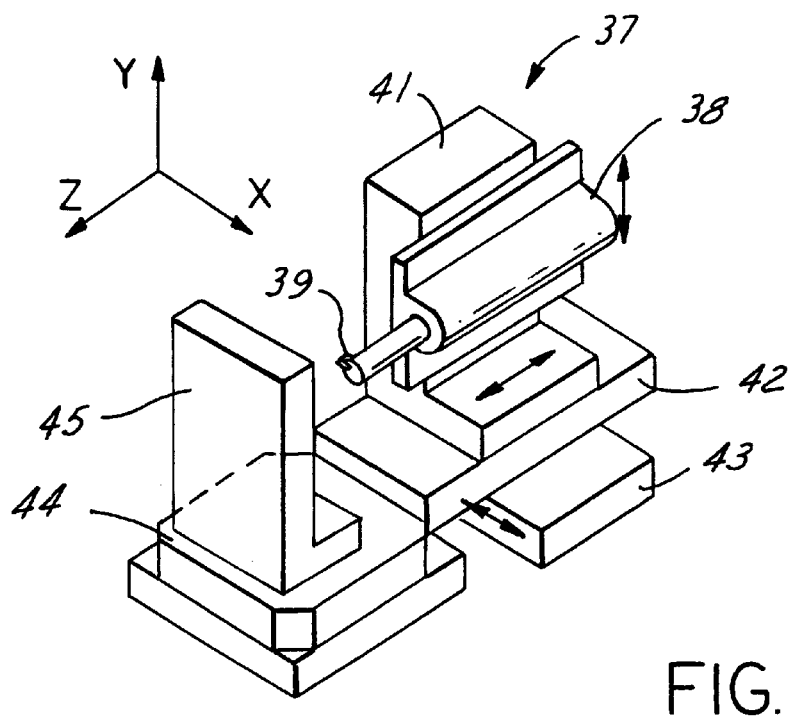
FIG. 4 shows the main machine axes of a three-axis machine tool.

FIG. 4 shows a typical three-axis machine tool 37 in which a spindle 38 carries a cutting tool 39. The spindle 38 is mounted for vertical motion along the Y-axis relative to a column support 41, and the column support 41 is mounted on a platen 42 for horizontal motion along the Z-axis 48, the direction of tool feed. The platen 42 is mounted for horizontal motion along the X-axis relative to a base 43. A worktable 44 is positioned opposite the platen 42, and in use, the worktable 44 normally receives a pallet assembly with a fixture and a workpiece 45.

Figure 5:
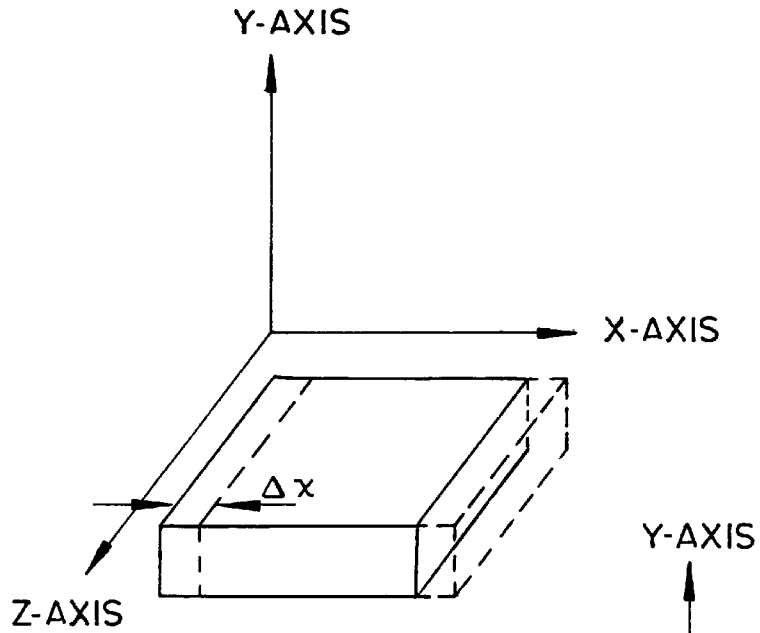
FIG. 5 shows a part positioned with a linear error $\Delta X$ in the X-direction.
Figure 6:
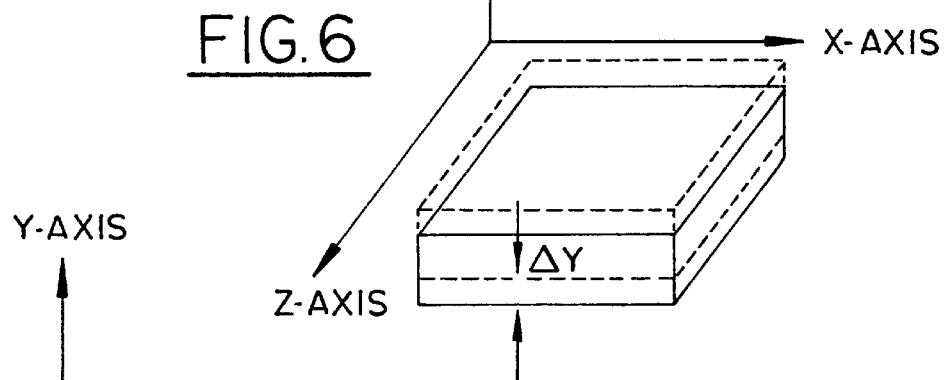
FIG. 6 shows a part positioned with a linear error $\Delta Y$ in the Y-direction.
Figure 7:
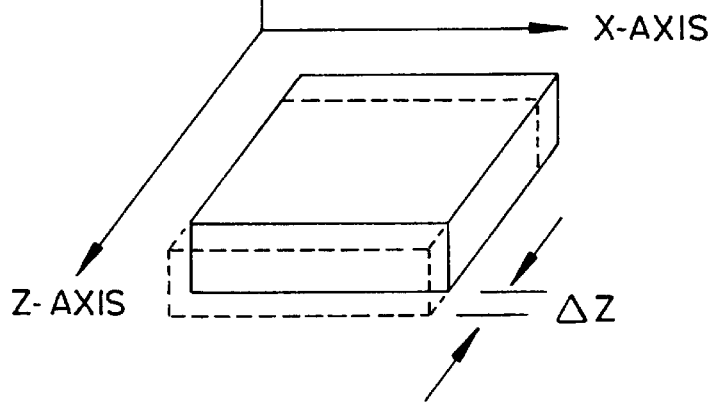
FIG. 7 shows a part positioned with a linear error $\Delta Z$ in the Z-direction.
Figure 8:
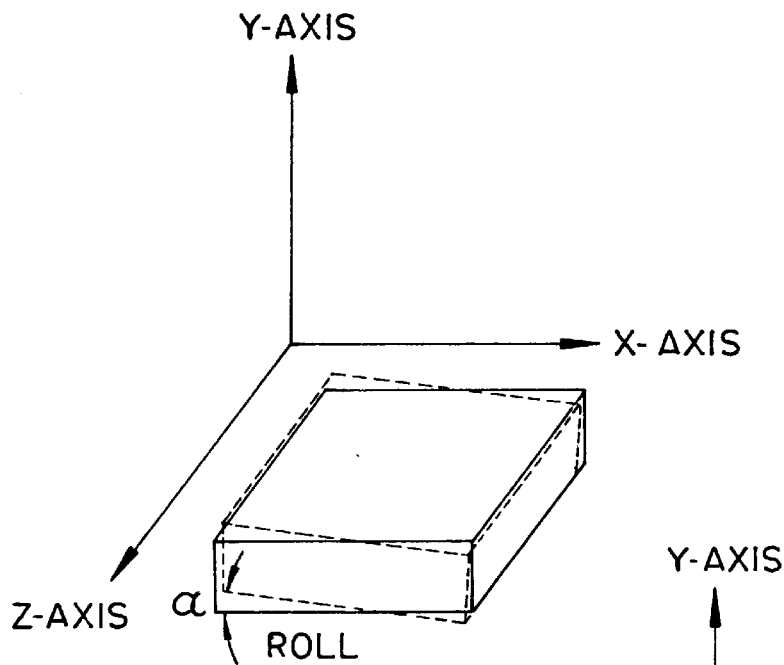
FIG. 8 shows a part positioned with an angular roll error, relative to the Z-axis.
Figure 9:
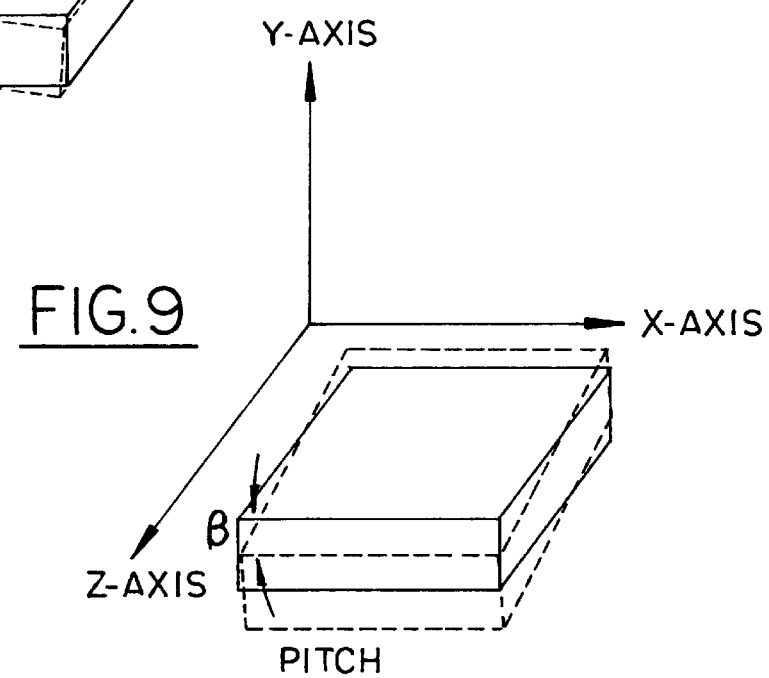
FIG. 9 shows a part positioned with an angular pitch error, relative to the X-axis.
Figure 10:
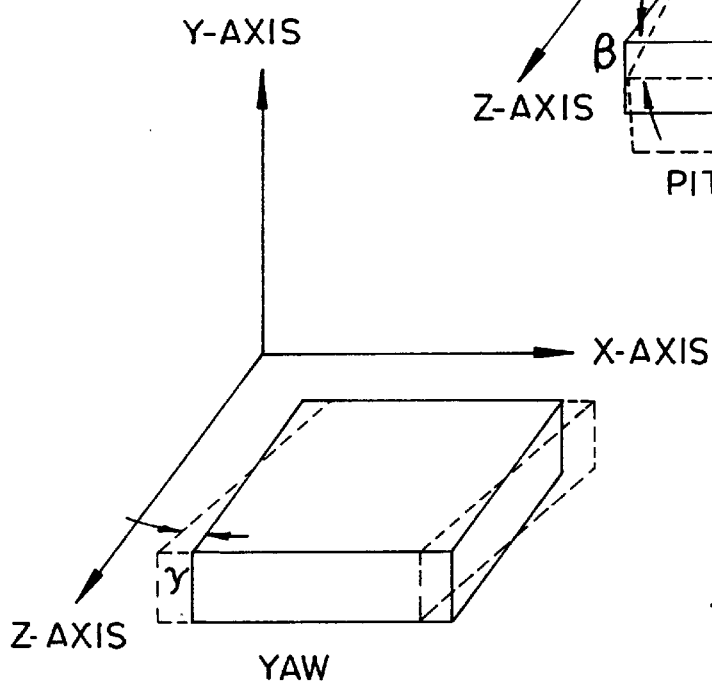
FIG. 10 shows a part with an angular yaw error, relative to the Y-axis.

FIGS. 5–10 are graphical representations of a part relative to the three axes of a machine tool showing the various errors which can occur in clamping the part in a fixture. FIG. 5 shows a $\Delta$-X error comprising horizontal displacement along the X-axis. FIG. 6 shows a $\Delta$-Y error comprising vertical displacement along the Y axis. FIG. 7 shows a $\Delta$-Z error comprising displacement in the direction of tool feed along the Z-axis. FIG. 8 shows a part with an angular roll error a comprising angular displacement around the Z-axis. FIG. 9 shows a part with an angular pitch error $\beta$ comprising angular displacement around the X-axis. FIG. 10 shows a part with an angular yaw error $\gamma$ comprising angular displacement around the Y-axis.

According to the invention, and as more fully explained below, a $\Delta$-X error, a $\Delta$-Y error, and a $\Delta$-Z error are all measured by the second part location system 64 (best seen in FIGS. 11 and 12), and are eliminated by linear offset values that are input to the machine tools at each of the stations 1 through N. A roll error measured by the second part location system 64 is also eliminated by an angular coordinate transformation value that is input to the machine tool controller at each of the machine tool stations 1 through N. Pitch error and yaw error are both measured by the second part location system 64 and eliminated by the pallet micro-positioner 81 (seen in FIGS. 13 and 15–17).

The offsets are used to compensate the CNC program in each of the machine tools 1 through N and insure that the part will be machined as intended despite the fact that the part is not clamped in the fixture in its exact intended location. A CNC machine program can be compensated for part errors in the X, Y, and Z direction, and for roll. The machine program cannot be compensated for pitch and yaw part position errors, and as a result, corrections to the pitch and yaw of the part as clamped in the fixture are made by the micro-positioner. In this way, any location or alignment errors of the part can be compensated, either through machine offsets, or through part alignment correction, so that the part can be accurately machined.

Figure 11:
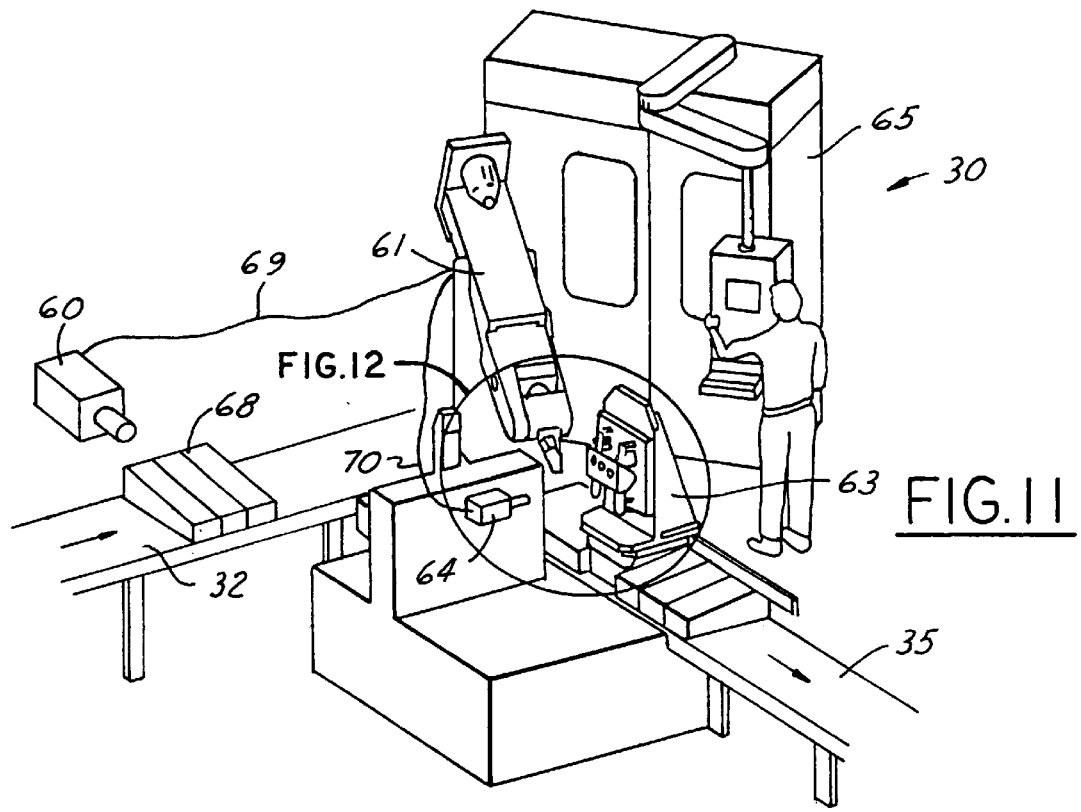
FIG. 11 shows a fixture configuration station with a robot manipulator, infeed and outfeed conveyors, and station controller.
Figure 12:
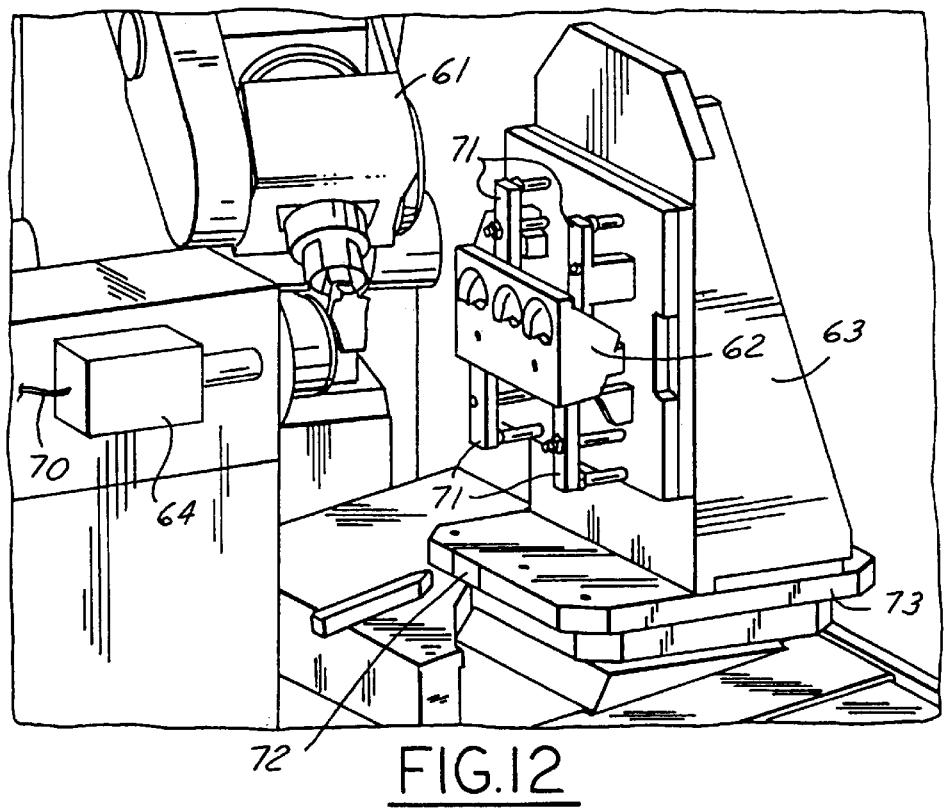
FIG. 12 shows a detail view of the fixture configuration station of FIG. 11.

Two views of fixture configuration station 30 are shown in FIG. 11 (wide-angle view) and FIG. 12 (close-up view). The fixture configuration station 30 is used to reconfigure a pallet fixture, load and unload a part to be machined, define the part location relative to the pallet reference frame, and actuate the micro-positioner to place the part in the proper alignment. The key elements of the fixture configuration station are a first part sensing system 60 such as a machine vision system or a contact probe which identifies parts as they come into the fixture configuration station 30, a robot manipulator 61 which loads a part 62 onto the fixture 63 and holds the parts while clamping is occurring, a second part sensing system 64 to sense the exact location of the loaded and clamped part on the fixture, and a CNC station controller 65, such as an Indramat MTC 200 controller.

A material handling input feed 32 such as an input conveyor or transfer line is used to convey parts to the fixture configuration station 30. The first part sensing system 60 scans the incoming parts 68 and communicates the information regarding part identification over a first communication link 69 such as a line or radio link to the station controller 65. In response to this information, the controller 65 determines which clamps 71 on the fixture 63 to use in order to hold the incoming part, and if necessary, the manipulator 61 will configure the clamps 71 on the fixture 63 in accordance with the size and shape of the part 62. The manipulator will also use the information to grip and place the part 62 into the fixture 63 at the fixture configuration station 30, and hold the part 62 against the fixture 62 while the clamps 71 are actuated to clamp the part 62 into position.

A second part sensing system 64 at the fixture configuration station 30 senses the part 62 after it has been clamped in the fixture 63, and develops signals representative of the exact position and angular orientation of the part, and these signals are sent to the station controller 65 over a second communication link 70. The position signals include the location of the part 62 along the X, Y, and Z axis, and the orientation signals includes the roll, pitch and yaw of the part 62. A computer in the station controller 65 compares the sensed position and orientation of the clamped part 62 to the desired position and orientation, and computes any deviations which exist. The computer in the station controller records the X error, Y error, Z error, and roll error of the clamped part 62 on a magnetic or RFID tag 72 mounted on the pallet 73, best seen in FIG. 18, while the pallet is in the fixture configuration station 30. As the part proceeds on line conveyors 33 from machine 1 to machine N for machining operations, the recorded errors $\Delta X$, $\Delta Y$, $\Delta Z$, and roll are read from the tag 72 at each machine position and used to offset the machine control program at that station in order to machine the part in accordance with the real position of the part, rather than the intended position of the part. While the part is still in the fixture configuration station 30, the pitch deviation $\beta$ and the yaw deviation $\gamma$ are used to actuate the micro-positioner, best seen in FIGS. 15–17, to correct any detected pitch and yaw errors in the orientation of the part, since these deviations cannot be compensated by programming changes on a 3-axis machine tool.

The second part sensing system 64 may use one of a variety of contact and non-contact technologies including touch trigger probes, analog touch probes, laser probes, scanning laser arrays, or optical sensing. The accuracy and repeatability of the second part sensing system, in combination with the micro-positioner must be a fraction of the smallest tolerances assigned to the machined features of the part family. Using currently available hardware, the second part sensing system and the micro-positioner will be able to locate a part with an accuracy of 5 microns.

Figure 13:
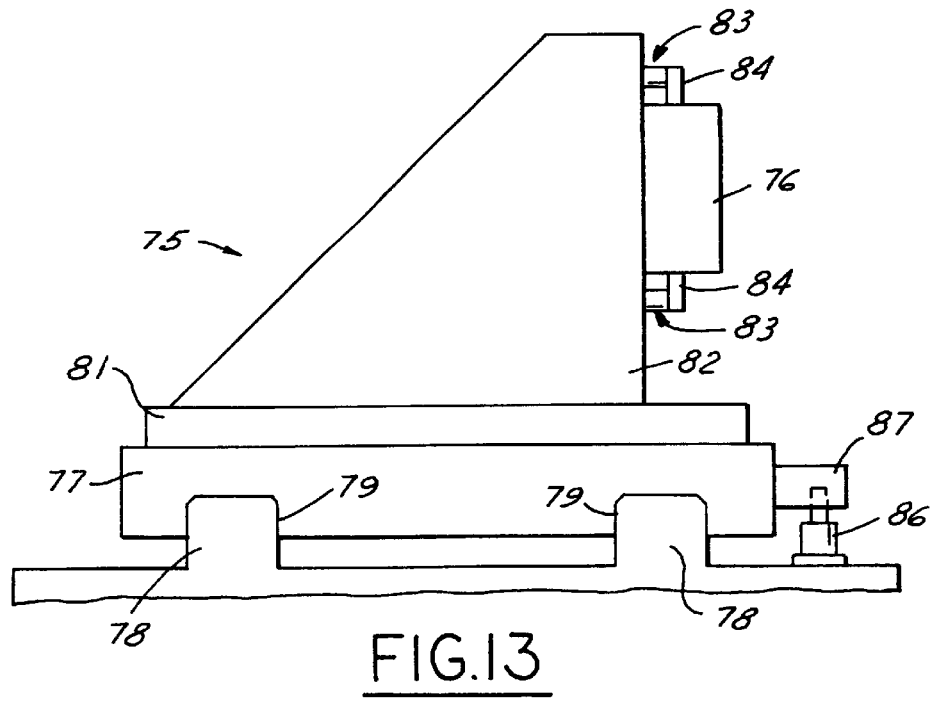
FIG. 13 shows a pallet assembly including a pallet, a micro-positioner, a fixture, and clamps.
Figure 15:
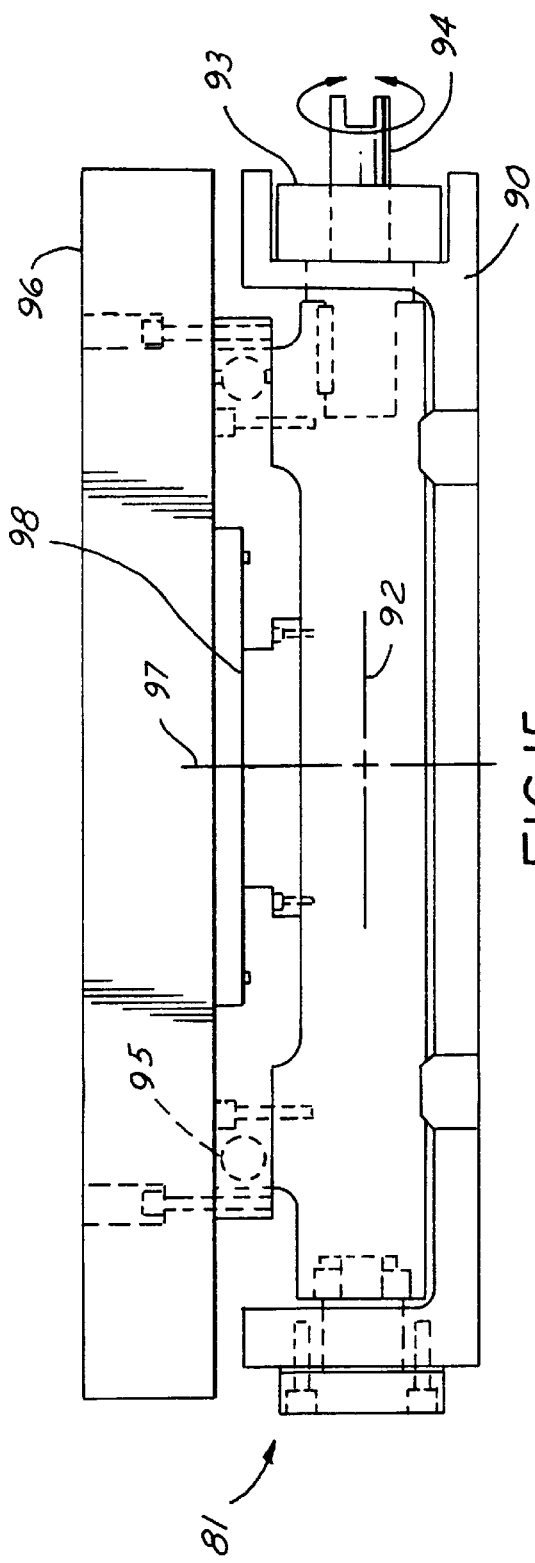
Figure 16:
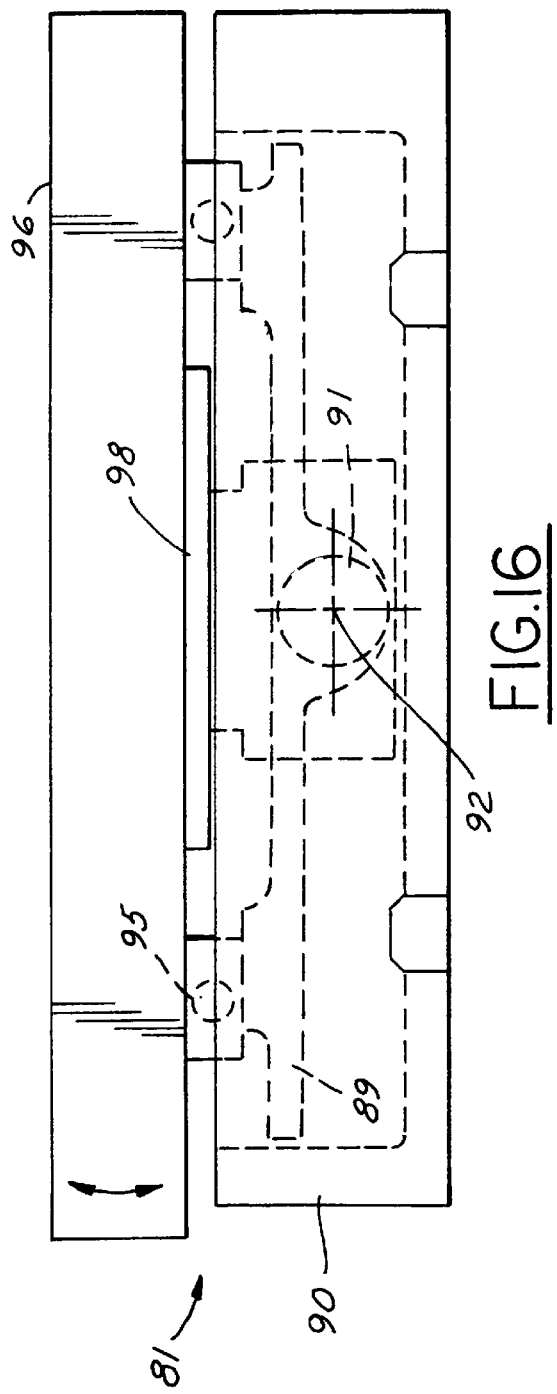

FIG. 13 shows a pallet assembly 75. Each pallet assembly 75 is used to support a part 76 which is moved by a series of conveyors or transfer mechanisms 33 from the fixture configuration station 30 to the machining stations 1 through N. The pallet assembly 75 comprises a standard pallet 77 which receives registry pins 78 in registry apertures 79 at the fixture configuration station 30 and each machining station 1 through N to precisely locate the pallet in the station. A micro-positioner 81, best seen in FIGS. 15 and 16, is mounted on the pallet 77, and a pallet fixture 82 is mounted on the micro-positioner. The micro-positioner 81 is used to orient a part relative to the pallet 77 for the purpose of correcting any part misalignment that may occur during the part loading and clamping process. The micro-positioner 81 provides at least two rotational degrees of freedom over a limited range of motion.

Figure 19:
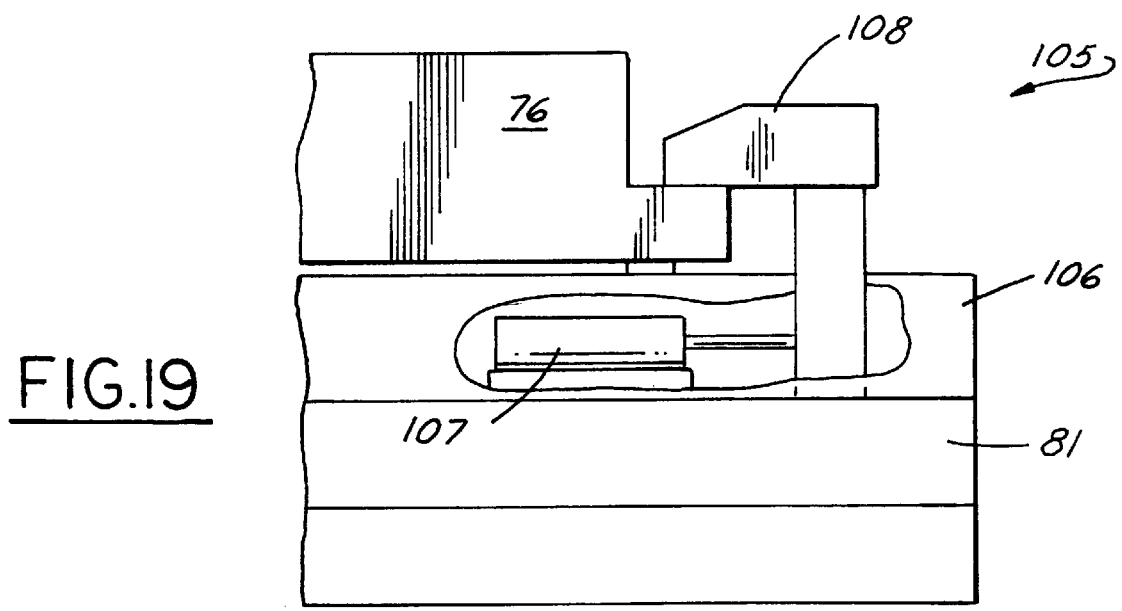
FIGS. 19 and 20 show two different embodiments of clamps used on the pallet assemblies.
Figure 20:
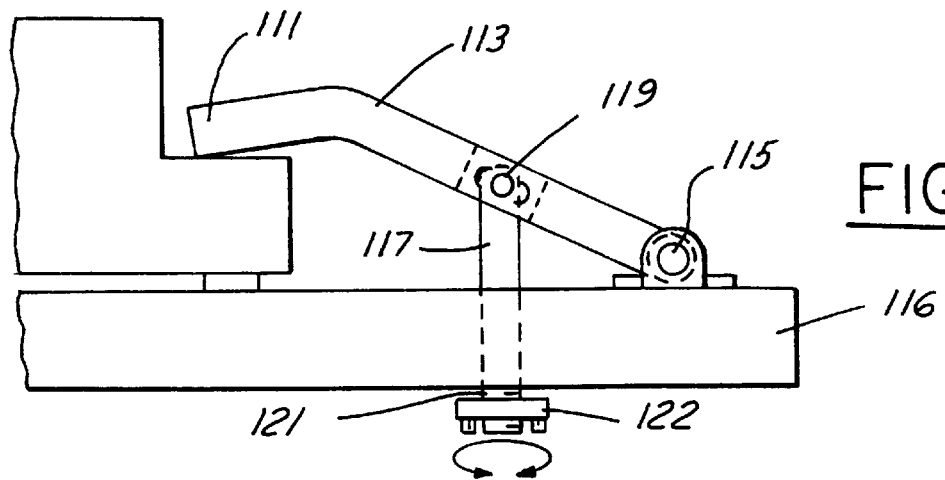

Each pallet fixture 82 has a set of adjustable clamps 83 that can be reconfigured to hold any part within a part family for any required set up. The clamps 83 may be mechanically, electrically, or hydraulically actuated and are adjustable mechanisms as opposed to modular fixture elements. The clamps are designed to facilitate reconfiguration and ensure that clamping can be accomplished within less time than the cycle time of any downstream machining process. Examples of suitable clamps are shown in FIGS. 19 and 20, and are described below.

Once clamped, the clamp jaws 84 are self-locking in position, and do not require the continued application of power to maintain a grip on the part 76. After a pallet assembly 75 leaves the fixture configuration station 30, the clamp force is maintained solely by elastic deformation of the clamps 83 which is developed by the clamping process. The flexible clamps 83 are movable on the fixture 82 to be able to clamp a family of workpieces, and the clamps 83 together with the fixture 82 form a flexible clamping system. The power needed to reconfigure the clamps 83, to engage the part 76, and to clamp the part is coupled to the pallet 77 by a electrical and hydraulic power feed 86 located at the fixture configuration station 30. The power feed 86 mates with an electrical and hydraulic socket 87 mounted on the pallet 77.

Figure 14:
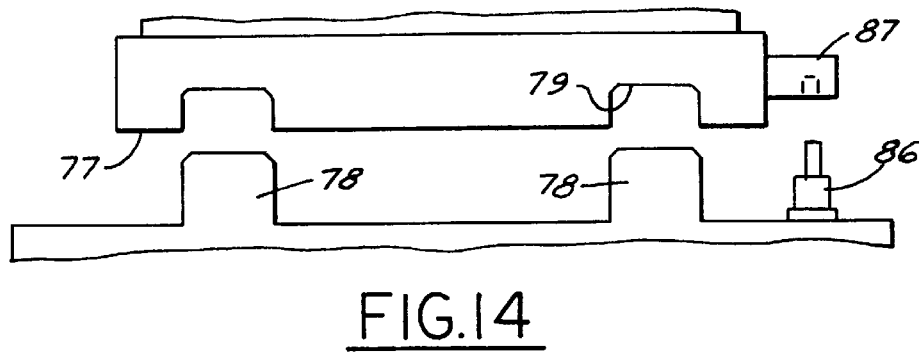
FIG. 14 is a detail view of a pallet assembly showing an uncoupled power connector and registry mechanism.

FIG. 14 shows the pallet 77 before being lowered into final position on the registry pins 78 at the fixture configuration station 30. In this position, the power feed 86 is disconnected from the connector socket 87 which is mounted on the side of the pallet 77.

Figure 17:
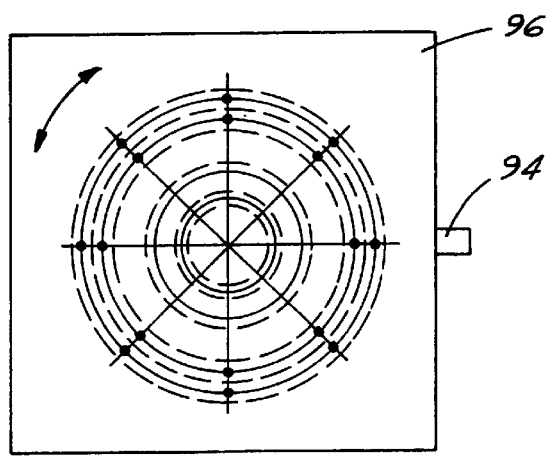
FIGS. 15, 16, and 17 show end, side, and plan views, respectively, of a micro-positioner according to the invention.

FIGS. 15–17 show the micro-positioner 81. The micro-positioner 81 is controlled by the computer in the station controller 65. The micro-positioner comprises a platform 89 which is mounted to a pallet 90 by a trunion 91 having a horizontal axis of rotation 92. One end of the trunion is provided with a gear reducer 93 and a mechanical drive coupling 94 which may be engaged by a rotary drive shaft (not shown). An annular bearing 95 is used to mount a turntable 96 on the platform 89 so that the turntable may be rotated about a vertical axis 97 relative to the platform. A pancake motor 98 with a gear reducer and a rotary encoder is mounted between the platform 89 and the turntable 96 in order to rotate the turntable 96 relative to the platform 89. The top surface of the turntable 96 is square or rectangular so that a fixture (not shown) can be mounted thereon, and the fixture receives a part which is clamped into position on the fixture in the normal way. In use, driving the rotary drive coupling 94 through the gear reducer 93 causes the platform 89 to tilt relative pallet 90. This tilt changes the pitch of the part relative to the X-axis of the machines 1 through N, and as a result, corrects any pitch error β which has been sensed by the second part sensing system 64. Powering the pancake motor 98 to rotate the turntable 96 around the vertical axis 97 changes the yaw of the part relative to the Y-axis of the machines 1 through N, and as a result, corrects any yaw error γ sensed by the second part sensing system 64.

In general, the required range of angular motion to be provided by the micro-positioner 81 is less than 3 degrees. However the rotational accuracy of the micro-positioner must be better than five arc-seconds, and the micro positioner must provide high rigidity during machining.

Figure 18:
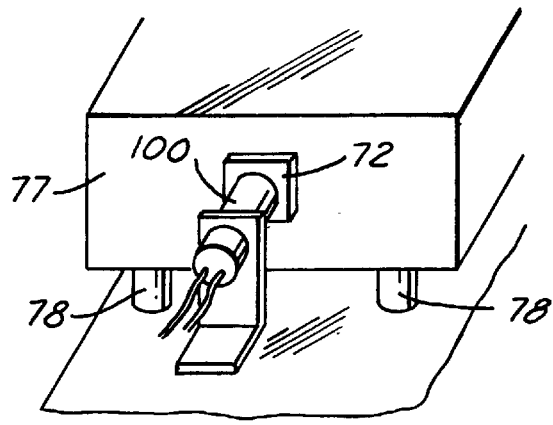
FIG. 18 shows a magnetic tag and reader used on the pallet assemblies.

FIG. 18 is a detail view of the read/write head 100 and tag 72 used to transfer part location data and process information developed at the fixture configuration station by the second part sensing system 64 to each of the machines 1 through N during the manufacturing process. Each pallet 77 has such a tag 72, and each tag is positioned on the side of the pallet 77 so as to be in alignment with the read/write head 100 when the pallet is registered on the registry pins 78 at the fixture configuration station 30 or any of the machine stations 1 through N. The tag 72 is used to identify the part on the pallet using information developed by the first part sensing system 60, plus record the part set up as sensed by the second part sensing system 64, and the processing history of the part through the system. The tag 72 is also used to convey translation and rotation offsets developed by the second part sensing system 64 as described above to each machine tool 1 through N. Information on the tag 72 is read by a read/write head 100 mounted at each machine station 1 through N.

The flexible clamps 28 used on the fixtures must have sufficient kinematic range to account for the variations of available clamping surfaces within the family of parts. FIG. 19 shows one form of clamp 105 which may be used in practicing the invention. The clamp 105 is mounted on a base 106 and the base is mounted on the micro-positioner 81. The clamp is powered by a hydraulic cylinder 107 which is controlled at the fixture configuration station 30 by the station controller 65. The hydraulic cylinder 107 opens and closes the clamp jaw 108 against the part 76, and is able to rotate the jaw 108 clear of the part, so that the part 76 can be removed from the base 106 and new part inserted. Such clamps are currently available and accordingly do not, per se, form a part of the present invention.

FIG. 20 shows another form of clamp in which the clamp jaw 111 is mounted on one end of a lever 113, and the other end of the lever is mounted to a first pivot 115 on the base 116. One end of a rod 117 is attached to the midpoint of the lever 113 by a second pivot 119, and the other end 121 of the rod 117 and passes through an aperture in the base 116. A nut 122 engages the threaded end 121 of the rod and a nut runner tool (not shown) may be used to engage the nut to clamp the part against the base.

The intelligent fixture system described above can also be adapted to a machining system which uses other than 3-axis CNC machine tools. If a 4-axis machine tool is used, the yaw error can be corrected by the machine tool controller and the micro-positioner only needs to adjust for the pitch error. If a 5-axis machine tool is used, all six errors can be corrected by the machine tool, and the micro-positioner can be eliminated.

The intelligent fixture system according to the instant invention will have the ability to accommodate a plurality of parts within a part family, and will remove the major bottleneck to implementing fully agile, flexible machining lines. As a result, fewer fixtures will have to be built, saving capital expenditure on equipment. Fixture changeover for various parts will be performed automatically by the fixture configuration station, providing the user with the ability to machine several parts in a part family without stocking several dedicated fixtures. The intelligent fixture system will also eliminate the need to create in-process machined locators that are non-functional to the part design, eliminating additional machines and eliminating all costs associated with producing these features.

Having thus described the invention, various alteration and modification will occur to those skilled in the art which alterations and modification are intended to be within the scope of the invention as defined by the appended claims.

I claim:

1. A flexible fixture system for fixturing and machining a family of parts in which the parts in the family are all similar to one another comprising:
    a fixture configuration station;
    an input conveyor for delivering the family of parts one at a time at the fixture configuration station;
    a station controller at the fixture configuration station;
    a pallet assembly at the fixture configuration station;
    robot means controlled by the station controller for loading a part onto the pallet assembly;
    means for sensing errors in the position and orientation of the loaded part on the pallet assembly;
    means for compensating for errors in the position and orientation of the part; and,
    an output conveyor extending from the fixture configuration station to a series of machine tools.

2. The flexible fixture system of claim 1 further comprising:
    a first part sensing system mounted along the input conveyor;
    means coupling signals from the first part sensing system to the station controller; and,
    a plurality of clamps on the pallet assembly, wherein the station controller controls the robot to configure the clamps on the pallet assembly in accordance with the configuration of the part as sensed by the first part sensing system.

3. The flexible fixture system of claim 1 further comprising:

a first part sensing system mounted along the input conveyor and a second part sensing system mounted at the fixture configuration station;

means coupling signals from the second part sensing system to the station controller;

a micro-positioner comprising part of the pallet assembly; and, means for adjusting the position of the part as sensed by the second part sensing system by adjusting the position of the micro-positioner.

4. The flexible fixture system of claim 3 further comprising:

a support platform comprising part of the micro-positioner, and first rotation means for rotating the support platform about at least one axis, whereby rotational error of the position of a part clamped in a fixture on the support platform may be corrected by the micro-positioner.

5. The flexible fixture system of claim 4 further comprising:

a data recording means mounted on the pallet assembly and means at the fixture configuration station for writing position information of the clamped part from the record part sensing system on the data recording means.

6. The flexible fixture system of claim 5 further comprising:

second rotation means for rotating the support platform of the micro-positioner about a second axis.

7. The flexible fixture system comprising:

a fixture configuration station including a station controller;

an input conveyor leading into the fixture configuration station;

an output conveyor leading out of the fixture configuration station;

a pallet assembly at the fixture configuration station, the pallet assembly comprising a pallet which supports a micro-positioner and a fixture having a plurality of clamps supported by the micro-positioner;

a first part sensing system mounted along the input conveyor and a second part sensing system mounted at the fixture configuration station;

means for adjusting the pitch and yaw of a part clamped in the fixture; and, means for recording on the pallet assembly X, Y, and Z position errors and roll orientation errors of the part clamped in the fixture.

8. The method of machining a family of parts comprising:

providing a fixture configuration station including a robot and a station controller;

sensing a part as it enters the fixture configuration station using a first part sensing system;

providing a pallet assembly at the fixture configuration station;

sensing the position and orientation of a part which is clamped into the pallet assembly using a second part sensing system;

developing X, Y, and Z axis offsets to compensate for X, Y, and Z axis position errors of the clamped part as sensed by the second part sensing system;

developing roll, pitch, and yaw orientation errors of the clamped part as sensed by the second part sensing system; and, adjusting the pitch and yaw of the clamped part to correct the pitch and yaw errors as sensed by the second part sensing system.

* * * * *